(12) United States Patent
Fletcher (10) Patent No.: US 8,341,441 B2
(45) Date of Patent: Dec. 25, 2012

(54) REDUCING ENERGY CONSUMPTION IN A CLOUD COMPUTING ENVIRONMENT

(75) Inventor: James C. Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/647,105

(22) Filed: Dec. 24, 2009

(65) Prior Publication Data

US 2011/0161696 A1    Jun. 30, 2011

(51) Int. Cl.
*G06F 1/26* (2006.01)
*G06F 15/173* (2006.01)
(52) U.S. Cl. ........................ 713/320; 713/300
(58) Field of Classification Search .................. 713/300, 713/320
See application file for complete search history.

(56) References Cited

U.S. PATENT DOCUMENTS

| | | | |
|---|---|---|---|
| 6,795,928 | B2 | 9/2004 | Bradley et al. |
| 6,990,593 | B2 | 1/2006 | Nakagawa |
| 6,993,571 | B2 | 1/2006 | Kistler |
| 7,590,873 | B2 | 9/2009 | Takahashi et al. |
| 7,783,909 | B2 * | 8/2010 | Hatasaki et al. ............ 713/324 |
| 8,127,298 | B2 * | 2/2012 | Kato et al. .................. 718/104 |
| 2004/0194087 | A1 | 9/2004 | Brock et al. |
| 2005/0251802 | A1 * | 11/2005 | Bozek et al. ...................... 718/1 |
| 2006/0112286 | A1 * | 5/2006 | Whalley et al. ............ 713/300 |
| 2006/0259621 | A1 * | 11/2006 | Ranganathan et al. ....... 709/226 |
| 2008/0014104 | A1 | 1/2008 | Huang et al. |
| 2009/0106571 | A1 | 4/2009 | Low et al. |
| 2009/0125737 | A1 | 5/2009 | Brey et al. |
| 2009/0222562 | A1 | 9/2009 | Liu et al. |
| 2009/0240964 | A1 | 9/2009 | Pfeiffer |
| 2009/0259345 | A1 | 10/2009 | Kato et al. |
| 2009/0300210 | A1 * | 12/2009 | Ferris ........................... 709/235 |
| 2010/0306354 | A1 * | 12/2010 | DeHaan et al. .............. 709/222 |
| 2012/0030356 | A1 | 2/2012 | Fletcher |

OTHER PUBLICATIONS

Srikantaiah, "Energy Aware Consolidation for Cloud Computing", Nov. 14, 2008 , 9 pages.

* cited by examiner

*Primary Examiner* — Kim Huynh
*Assistant Examiner* — Zahid Choudhury
(74) *Attorney, Agent, or Firm* — DeLizio Gilliam, PLLC (57) ABSTRACT

Functionality can be implemented within a cloud manager to leverage energy consumption data of cloud processing and their associated facility resources when selecting computing nodes to complete the job. The cloud manager can determine possible computing nodes to complete the job based on the job attributes. The cloud manager can determine aggregate energy data of the cloud resources from an energy usage database. The cloud manager can analyze the energy usage data to determine a configuration of the computing nodes to perform the job that reduces total energy consumption. For example, a configuration of servers can be based on a number of servers and processor utilization at the servers to perform the job. The cloud manager can assign the job to the servers and set the processor utilization at the servers in accordance with the resource configuration determined to minimize energy consumption.

20 Claims, 4 Drawing Sheets

REDUCING ENERGY CONSUMPTION IN A CLOUD COMPUTING ENVIRONMENT

BACKGROUND

Embodiments of the inventive subject matter generally relate to the field of cloud computing, and, more particularly, to reducing energy consumption in a cloud computing environment.

Cloud computing is a computing technology that uses the internet and central remote servers to maintain data and applications. Cloud computing allows consumers and businesses to use applications without installation and access their personal files at any computer with internet access. Cloud computing architecture is abstracted from users who do not need knowledge about or control over the technology infrastructure inside the "cloud." Users of cloud computing typically do not own the physical infrastructure allowing them to avoid capital expenditures. Instead, the users consume resources as a service and only pay for the resources they use.

SUMMARY

Embodiments include a method directed to determining a plurality of computing nodes capable of serving a job submitted to a cloud. The cloud comprises the plurality of computing nodes. A peripheral associated with each of the plurality of computing nodes is determined. A first energy usage at a first processing utilization of a first set of computing nodes of the plurality of computing nodes and of the peripherals associated with the first set of computing nodes is computed. A second energy usage at a second processing utilization of a second set of computing nodes of the plurality of computing nodes and of the peripherals associated with the second set of computing nodes is computed. The first energy usage and the second energy usage are evaluated. The job is dispatched to the first set of computing nodes at the first processing utilization based, at least in part, on said evaluating the first energy usage and the second energy usage.

Embodiments include a computer program product for conserving energy usage in a cloud computing environment. The computer program product comprises a computer usable medium having computer usable program code. In embodiments, the computer usable program code is configured to determine resources of a cloud capable of serving a job. The resources comprise computing nodes and associated peripherals. The computer usable program code is configured to determine different configurations of the resources that comport with attributes of the job. The different configurations comprise at least one of different processing utilizations and different sets of the computing nodes. The computer usable program code is configured to compute energy usages for the different configurations of the resources of the cloud. The computer usable program code is configured to dispatch the job in accordance with a first of the different configurations of the resources.

Embodiments include a computer program product for conserving energy usage in a cloud computing environment. The computer program product comprises a computer usable medium having computer usable program code. In embodiments, the computer usable program code is configured to determine a plurality of computing nodes capable of serving a job submitted to a cloud. The cloud comprises the plurality of computing nodes. The computer usable program code is configured to determine a peripheral associated with each of the plurality of computing nodes. The computer usable program code is configured to compute a first energy usage at a first processing utilization of a first set of computing nodes of the plurality of computing nodes and of the peripherals associated with the first set of computing nodes. The computer usable program code is configured to compute a second energy usage at a second processing utilization of a second set of computing nodes of the plurality of computing nodes and of the peripherals associated with the second set of computing nodes. The computer usable program code is configured to evaluate the first energy usage and the second energy usage. The computer usable program code is configured to dispatch the job to the first set of computing nodes at the first processing utilization based, at least in part, on said evaluating the first energy usage and the second energy usage.

Embodiments include an apparatus comprising a processing unit, a network interface, and a cloud manager. The cloud manager is operable to determine resources of a cloud capable of serving a job. The resources comprise computing nodes and associated peripherals. The cloud manager is operable to determine different configurations of the resources that comport with attributes of the job. The different configurations comprise at least one of different processing utilizations and different sets of the computing nodes. The cloud manager is operable to compute energy usages for the different configurations of the resources of the cloud. The cloud manager is operable to dispatch the job in accordance with a first of the different configurations of the resources.

BRIEF DESCRIPTION OF THE DRAWINGS

The present embodiments may be better understood, and numerous objects, features, and advantages made apparent to those skilled in the art by referencing the accompanying drawings.

FIGS. 2-3 are flowcharts depicting example operations for selecting resources in a cloud computing environment to complete a job based on energy usage data.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to utilizing configuration management database (CMDB), embodiments may utilize other types of databases or data storage structures/techniques. In other instances, well-known instruction instances, protocols, structures, and techniques have not been shown in detail in order not to obfuscate the description.

When a user submits a job to a cloud computing environment, computing nodes are selected to serve the job based on attributes of the job (e.g., processing power desired for the job, quality of service for the job and/or the entity submitting the job, type of job, desired completion time, location of data to be accessed for the job, purchased processing time, policy of the cloud computing environment, etc.) without regard to energy consumption of the selected resources. Functionality can be implemented within a cloud manager to leverage energy consumption data of cloud resources when selecting computing nodes to complete the job. The cloud manager can determine possible computing nodes (e.g., blade servers, processor books, computers, cores, etc.) to complete the job based on the job attributes. The cloud manager can determine aggregate energy data of the resources (e.g., computing nodes and peripherals associated with the computing nodes) from an energy usage database. The cloud manager can analyze the energy usage data to determine a configuration of the computing nodes to perform the job that reduces energy consumption. For example, a configuration of servers can be based on a number of servers and processor utilization at the servers to perform the job. The cloud manager can assign the job to the servers and set the processor utilization at the servers in accordance with the resource configuration determined to minimize energy consumption.

Figure 1:
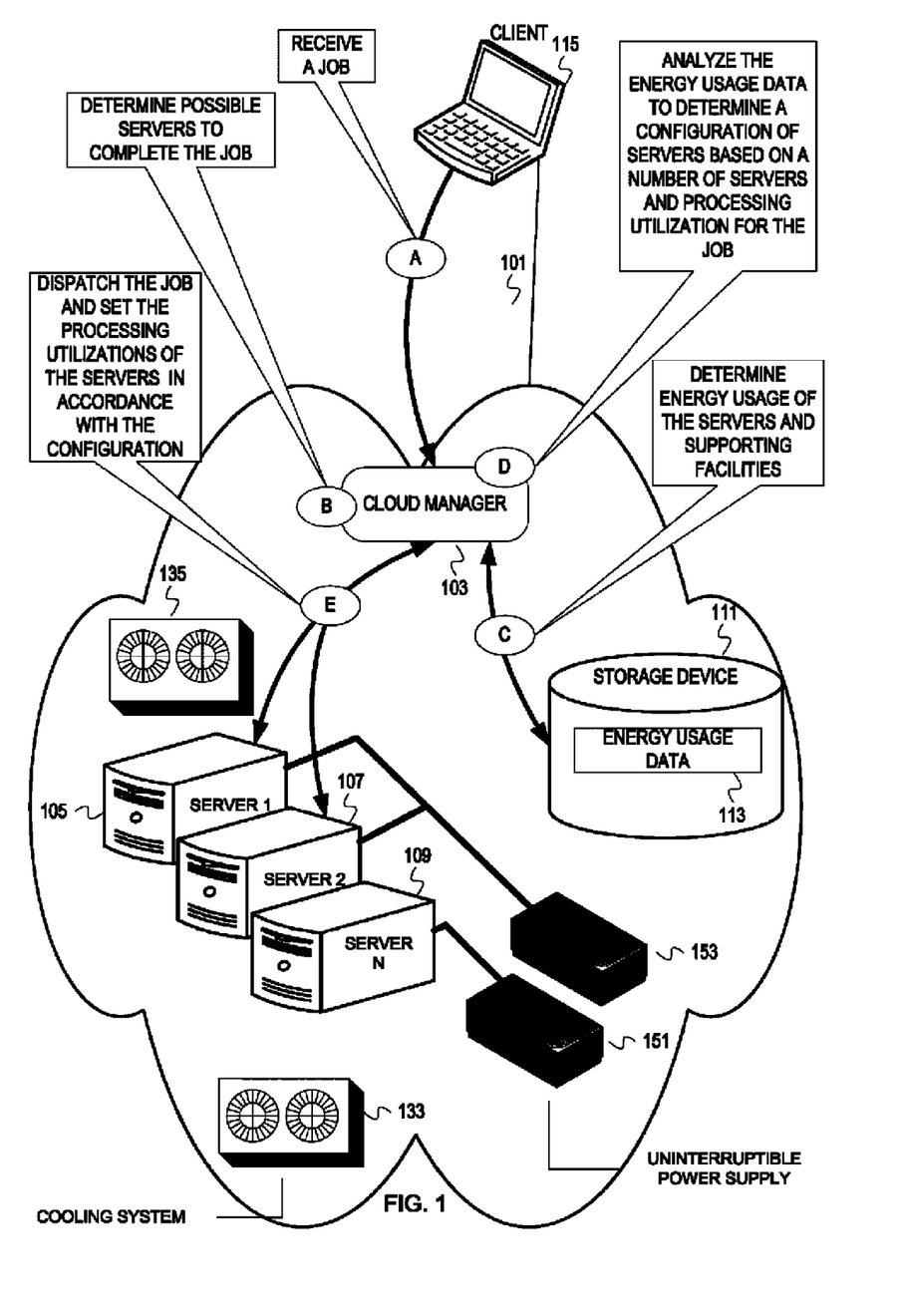
FIG. 1 is an example conceptual diagram of selecting servers in a cloud environment to run a job based on energy consumption data.

FIG. 1 is an example conceptual diagram of selecting servers in a cloud environment to run a job based on energy consumption data. A cloud 101 comprises a cloud manager 103, a group of servers, and a storage device 111. The group of servers comprises server 1 105, server 2 107, and server N 109. The storage device 111 hosts energy usage data 113. The cloud 101 also comprises supporting facilities. In FIG. 1, the supporting facilities include cooling systems 133, 135, and uninterruptible power supplies (UPSs) 151, 153. Although the diagram is a conceptual diagram, FIG. 1 depicts the cooling system 133 nearest the server N 109, and the cooling system 135 is proximate to the server 1 105 and the server 2 107. FIG. 1 also depicts the UPS 151 supporting the server N 109, and the UPS 153 supporting both the server 1 105 and the server 2 107. Although not shown, the cloud 101 may comprise additional servers and/or additional storage devices.

At stage A, the cloud manager 103 receives a job from a client 115. For example, the client 115 submits the job through a web services interface of the cloud 101.

At stage B, the cloud manager 103 determines possible servers to complete the job. The cloud manager 103 can determine the possible servers based on attributes of the job. Examples of job attributes include type of work, processing power desired, desired completion time, types of resources indicated, etc. For example, the cloud manager 103 determines that the job indicates that IBM zSeries® servers should be used to complete the job. So, the cloud manager 103 determines the zSeries servers in the cloud as possible servers to complete the job. The cloud manager 103 can also determine a range for a number of servers to complete the job based on the attributes. For example, the cloud manager 103 determines that three to five servers should be used to complete the job based on work indicated in the job and a desired completion time. In this example, the cloud manager 103 determines server 1 105, server 2 107 and server N 109 as possible servers to complete the job.

At stage C, the cloud manger 103 determines energy usage of the servers 105, 107, and 109 based on the energy usage data 113. The energy usage data 113 can be collected with various techniques. Examples of techniques for collecting energy usage data include the following: running a series of tests on the servers 105, 107, and 109 when the cloud 101 is configured and measuring energy usage during the tests; measuring energy usage of the servers 105, 107, and 109 over time during normal operation; computing values representative of projected energy usage based on specifications of the servers and associated peripherals, etc. The energy usage data relates energy usage to processor/core utilization ("processing utilization") of each of the servers 105, 107, and 109. Energy usage of peripherals (e.g., internal cooling systems, external cooling systems, uninterruptible power supplies, etc.) associated with the servers can be integrated into the energy usage data or can be stored separately. The cloud manager 103 can determine relationships between each of the servers and the peripherals from a CMDB. The relationships can be used to correlate separately stored energy usage data of the peripherals with energy usage data of the servers 105, 107, and 109.

At stage D, the cloud manager 103 analyzes the energy usage data to determine a configuration of servers based on a number of servers and processing utilizations to perform the job, as well as aggregate energy usage of the configurations. The aggregate energy usage of a configuration takes into account the energy usage of the servers of a configuration and the peripherals associated with the servers in the configuration. Each of the servers in the configuration can be set to different processing utilizations or the servers can be set to a uniform processing utilization. The cloud manager 103 can determine maximum processing utilization for different energy usage thresholds of each of the servers 105, 107, and 109. The cloud manager 103 can determine a plurality of potential server configurations based on the range determined in stage B and compute energy usage of each of the plurality of potential configurations based on the individual server's energy usage data. In this example, the range may be two to three of the servers 105, 107, and 109. So, the cloud manager 103 determines potential configurations based on two servers and potential configurations based on three servers. The cloud manager 103 can then compute aggregate energy usages for the two server configurations and the three server configurations. For instance, for a three server configuration that involves the servers 1 105, the server 2 107, and the server N 109, the cloud manager 103 will compute an aggregate energy usage that factor in the energy usage data of both UPSs 151, 153 and both cooling systems 133, 135. For a two server configuration that involves the server 1 105 and the server 2 107, the cloud manager will compute an aggregate energy usage that factors in the energy usage of the UPS 153 and the cooling system 135. The cloud manager 103 can choose one of the potential configurations to minimize energy usage. The cloud manager 103 may determine that running two of the servers at a higher processing utilization (e.g., 50% processing capability) comports with the job attributes and uses less energy than running three servers at the processing utilizations (e.g., 33% processing capability) corresponding to the lowest energy usage threshold of each of the three servers.

At stage E, the cloud manager 103 dispatches the job to the servers in accordance with the configuration and sets the processing utilizations of the servers in accordance with the determined resource configuration. In this example, the cloud manager 103 dispatches the job to the server 1 105 and the server 2 107.

Figure 2:
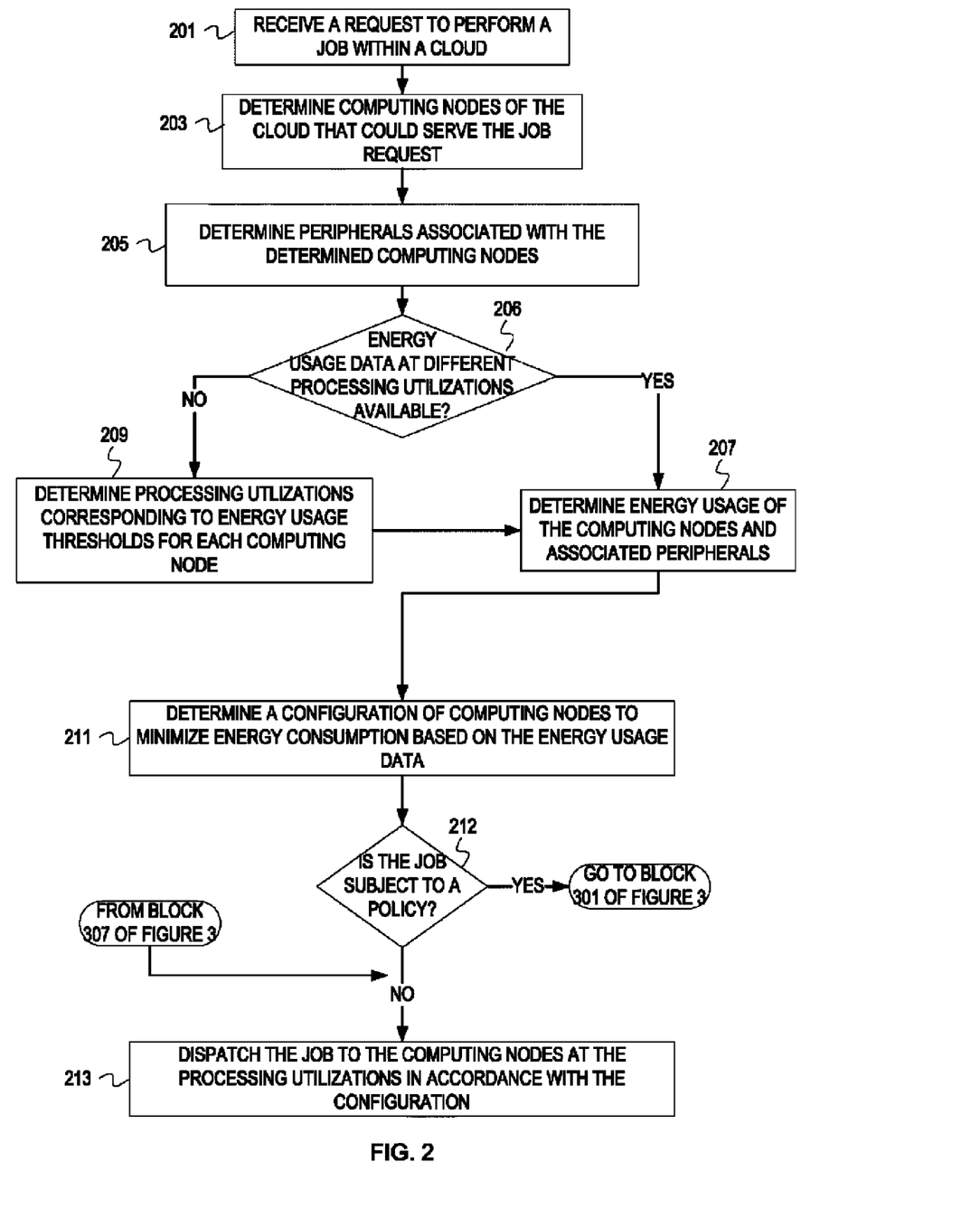
FIG. 2 is a flowchart of examples operations for determining an energy conservation job configuration of computing nodes.
Figure 3:
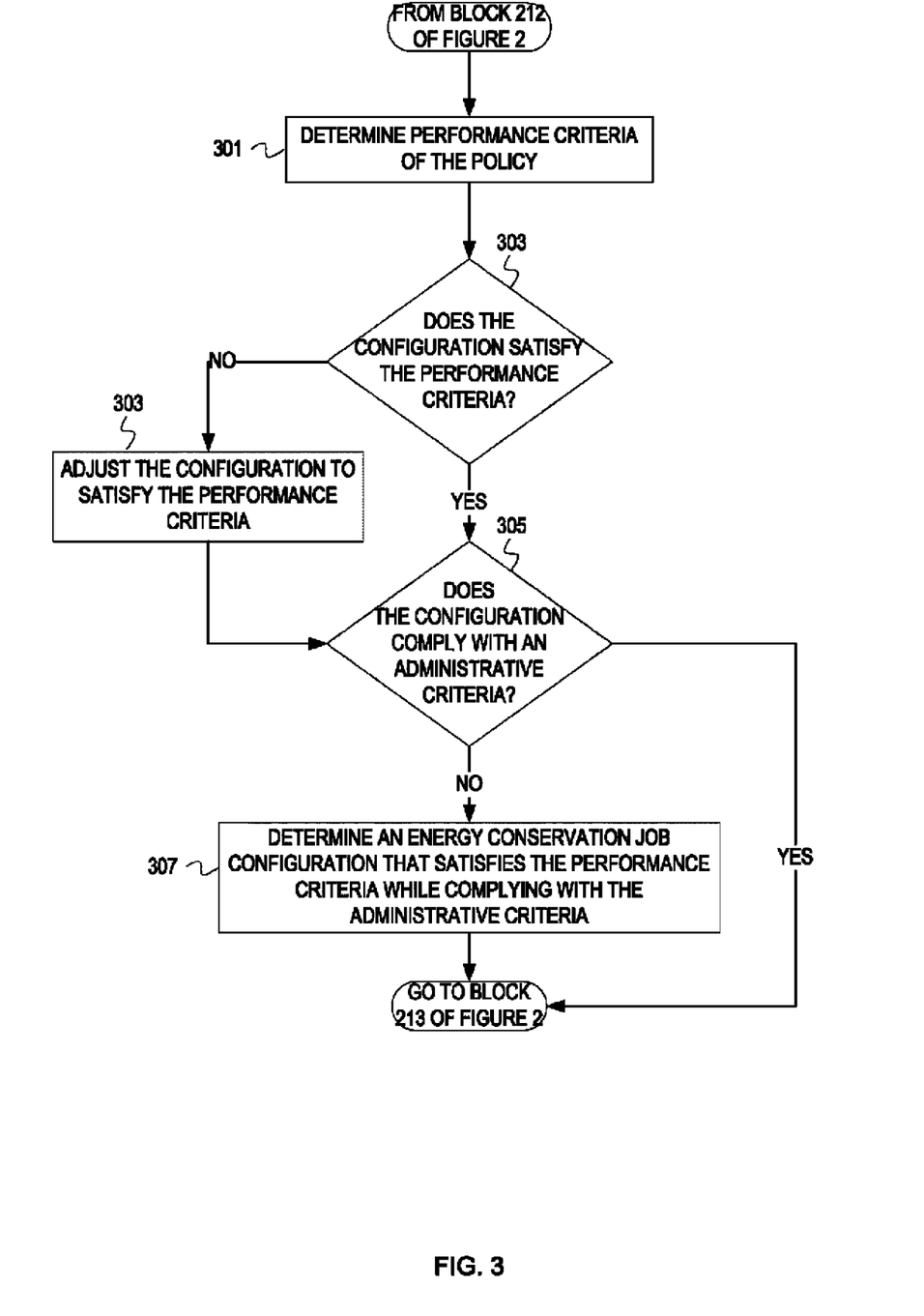
FIG. 3 is a flowchart depicting example operations that continue from FIG. 2.

FIGS. 2-3 are flowcharts depicting example operations for selecting resources in a cloud computing environment to complete a job based on energy usage data. Flow begins at block 201, where a job is received. For instance, a client submits a job request through a front end of a cloud. Examples of submitting a job via a cloud front end include the following: an application programming interface (API) call with a specific application on the client; a job request submitted via a web browser, and submitting a request to an intermediate entity.

At block 203, computing nodes that can serve the job request are determined. For example, a cloud manager determines that any server in a cloud could be used to complete the job. As another example, the cloud manager determines a particular type of server associated with a particular data store should be used to serve the job request based on a job type indicated in the job request and parameters indicating a dataset. Determining potential computing nodes can be based on availability of computing nodes in the cloud. For example, the cloud manager may not identify a server as a potential server if an amount of work already dispatched to the server meets (or exceeds) a threshold. Determining potential servers can comprise determining a range for a number of servers to serve the job request. For example, the cloud manager determines that five to seven servers should be used based on processing power allowed to the client (e.g., company, user, etc.) and time allotted to perform the job. In other cases, the job request itself may specify a range of servers.

At block 205, peripherals associated with the determined computing nodes are determined. The cloud manager can determine the peripherals from a CMDB that stores information about cloud topology and infrastructure. Energy usage of the peripherals (e.g., cooling systems, uninterruptible power source (UPS), etc.) is related to energy usage of the computing nodes. For example, more cooling is necessary when a clock rate of a computing node increases because the server generates more heat at higher clock rates. As another example, as the clock rate of a computing node increases, load on a cooling unit cooling the computing node increases and causes the cooling unit to consume more energy. The associations are utilized to aggregate energy usage of a computing node with energy usage of the corresponding/associated peripherals.

At block 206, it is determined if energy usage data at different processing utilizations of the computing nodes is available. If energy usage data at different processing utilizations of the computing nodes is available, then the flow continues to block 207. Otherwise, the flow continues to block 209.

At block 207, energy usage of the computing nodes and the associated peripherals are determined. Energy usage data can be collected from data stores, dynamically determined with energy usage tests, collected in advance and updated periodically, etc. For instance, the cloud manager can retrieve energy usage data of the computing nodes and the associated peripherals. The energy usage data can be collected by measuring energy usage while running a series of tests on the computing nodes when a cloud is configured, measuring energy usage of the computing nodes and peripherals over time during normal operation, etc. If energy usage data is unavailable for a computing node at a particular processing utilization (e.g., a certain clock rates, without certain architectural elements, such as cache, enabled) because the computing node has not been run at the processing utilization, the cloud manager (or a separate process responsible for collecting energy usage data) can estimate energy usage of the computing node at the processing utilization based on existing energy usage data of the computing node, energy usage data corresponding to a similar computing node that was run at the processing utilization, etc. Control flows from block 207 to block 211.

At block 209, processing utilizations corresponding to energy usage thresholds are determined for each computing node. For example, the cloud manager can compute energy usage curves as a function of clock rate for each computing node. The computed energy usage curves can be stored in an energy usage data structure indexed/accessed by identifiers of the corresponding computing node. The cloud manager can then determine energy usage thresholds based on the energy usage curves and determine a maximum clock rate that can be utilized for each of the thresholds. For example, a first energy usage threshold indicates that a server can be run at 35% of a nominal clock rate because a difference in energy consumption up to 35% is negligible. Embodiments can also compute energy usage of a first computing node and extrapolate energy usage for computing nodes with same or similar specifications. Control flows from block 209 to block 207.

At block 211, a configuration of computing nodes to minimize energy consumption ("energy conservation job configuration") is determined based on the determined energy usage. The configuration can comprise a number of computing nodes to complete the job and processing utilizations for the computing nodes. An energy conservation job configuration can identify computing nodes (e.g., serial numbers, network addresses, etc.) and/or types of computing nodes (e.g., model numbers, processor types, etc.) for the job. Determining a configuration can involve determining a plurality of candidate configurations, and computing energy usage of each of the plurality of candidate energy conservation job configurations. For example, energy usage can be computed for a first candidate energy conservation job configuration based on three computing nodes each running at 33% of nominal processing utilization. Energy usage can be computed for a second candidate energy conservation job configuration based on two computing nodes running at 50% of nominal processing utilization. The cloud manager can choose the candidate energy conservation job configuration with a lowest overall energy usage.

At block 212, it is determined if the job is subject to a policy(ies). Policies for the job can be indicated by a user that submits the job request, a cloud administrator, or a combination thereof. For example, a user can indicate a policy for the job such that energy usage optimization should not impact performance by more than 20 percent. As another example, the cloud administrator can define a policy for maximum energy usage allowed for any job submitted to the cloud. The maximum energy usage for a job can be based on a size of the job. If the job is not subject to a policy(ies), flow continues at block 213. If the job is subject to a policy(ies), flow continues at block 301 of FIG. 3.

At block 213, the job is dispatched to the computing nodes at the processing utilizations in accordance with the energy conservation job configuration.

FIG. 3 is a flowchart depicting example operations that continue from FIG. 2. Flow continues from block 212 of FIG. 2 at block 301. Performance criteria of the policy are determined at block 301.

At block 303, it is determined if the energy conservation job configuration of servers satisfies the performance criteria. For example, the performance criteria may indicate a guaranteed completion time for the type of requested job. The cloud manager can compute an estimated time of completion based on the processing utilization indicated by the energy conservation job configuration to determine if the configuration can meet satisfy the performance criteria. If the configuration does not satisfy the performance criteria, flow continues at block 303. If the configuration satisfies the performance criteria, flow continues at block 305.

At block 303, the configuration did not satisfy performance criteria, so the energy conservation job configuration is adjusted to satisfy the performance criteria. For example, the cloud manager determines that a configuration with a second lowest overall energy usage satisfies the performance criteria. Embodiments can store the plurality of candidate energy conservation job configurations, and select the one of the plurality of energy conservation job configuration that best satisfies the performance criteria.

At block 305, it is determined if the energy conservation job configuration of computing nodes violates administrative criteria. For example, the administrative criteria can indicate a maximum energy usage allowed for any job. As another example, the administrative criteria can indicate a maximum number of computing nodes that can be assigned to any job. The administrative criteria can have precedence over the performance criteria. Criteria can be indicated in different policies with different compliance criteria. Policies can also conform to an organizational hierarchy (e.g., cloud policy, sub-cloud policy, geographic policy, customer policy, etc.). If the configuration violates the administrative criteria, flow continues at block 307. If the configuration does not violate the administrative criteria, flow continues at block 213 of FIG. 2.

At block 307, an energy conservation job configuration of computing nodes that best satisfies the performance criteria while complying with the administrative policy is determined. For example, the administrative criteria define a maximum energy usage for any job. The cloud manager determines that the configuration that satisfies the performance criteria violates the administrative criteria, so the cloud manager chooses a configuration with the best performance with an overall energy usage lower than the maximum energy usage indicated in the administrative criteria. Flow continues at block 213 of FIG. 2.

Embodiments are not limited to the example flowcharts depicted in the above figures. Embodiments can perform additional operations, fewer operations, operations in parallel, etc. For instance, referring to FIGS. 2 and 3, the operations for determining a configuration to minimize energy and for determining if the job is subject to polices can be interchanged.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
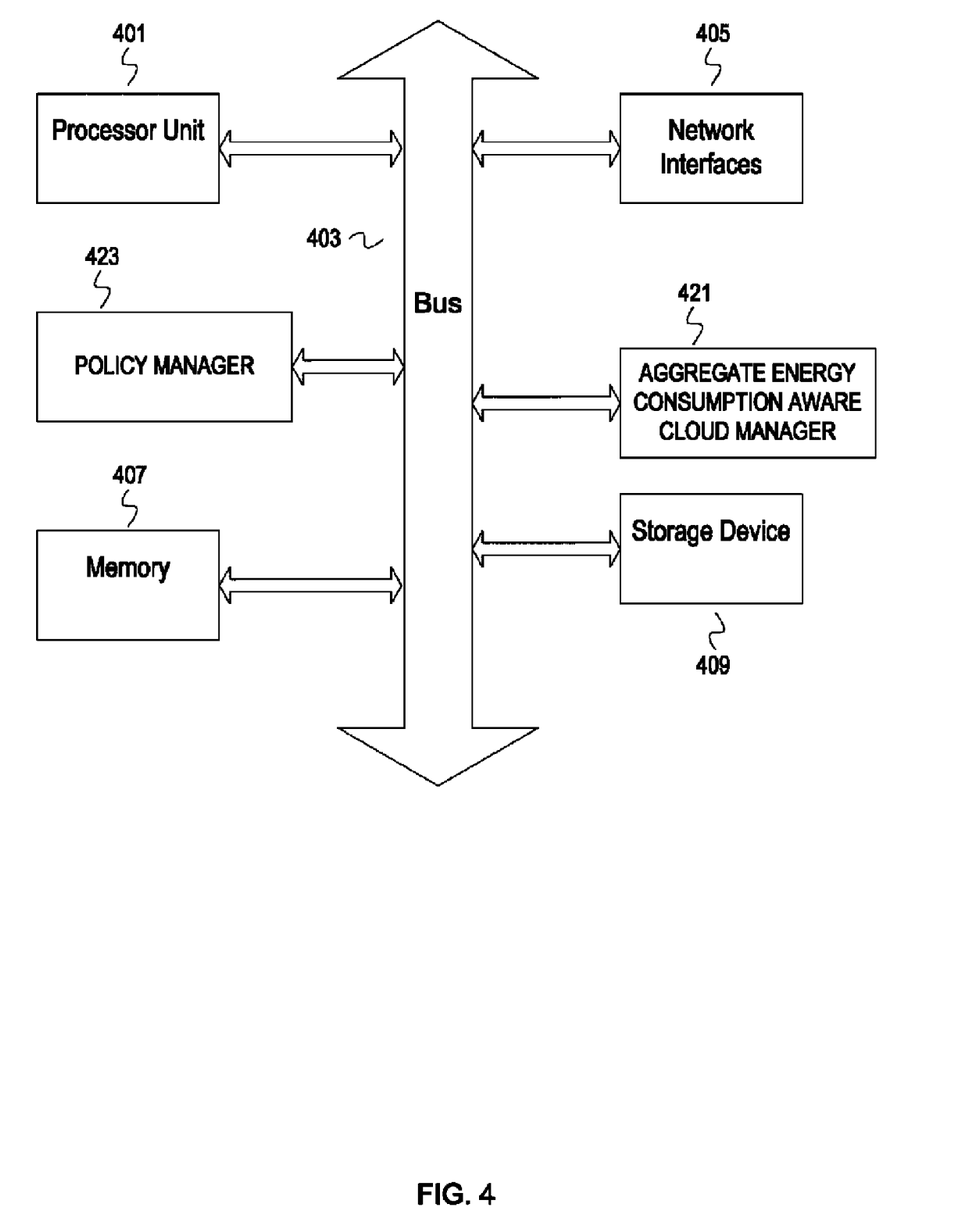
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer system also includes a bus 403, a network interface 405 (e.g., an ATM interface, an Ethernet interface, a Frame Relay interface, SONET interface, wireless interface, etc.), and a storage device(s) 409 (e.g., optical storage, magnetic storage, etc.). The computer system also includes an aggregate energy consumption aware cloud manager 421 ("cloud manager") and a policy manager 423. The cloud manager 421 determines an energy conservation job configuration of computing nodes to complete a job based on optimizing energy usage. Any one of the functionalities for determining an energy conservation job configuration of computing nodes may be partially (or entirely) implemented in hardware and/or on the processing unit 401. For example, the functionality may be implemented with an application specific integrated circuit, in logic implemented in the processing unit 401, in a co-processor on a peripheral device or card, etc. The policy manager 423 at least communicates policies that govern jobs to the cloud manager 421. Embodiments can implement the policy manager 423 to also evaluate one or more energy conservation job configurations against a policy that governs the relevant job. The policy manager 423 can then indicate to the cloud manager 421 those of the energy conservation job configurations that comply with the policy, or select from those presented by the cloud manager 421. As with the cloud manager 421, functionality of the policy manager 423 may be partially (or entirely) implemented in hardware and/or on the processing unit 401. Further, realizations may include fewer or additional components not illustrated in FIG. 4 (e.g., additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for optimizing energy consumption in a cloud environment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining a plurality of computing nodes for serving a job submitted to a cloud, wherein the cloud comprises the plurality of computing nodes;
   determining a peripheral associated with each of the plurality of computing nodes;
   computing a first energy usage at a first processing utilization of a first set of computing nodes of the plurality of computing nodes and of the peripherals associated with the first set of computing nodes;
   computing a second energy usage at a second processing utilization of a second set of computing nodes of the plurality of computing nodes and of the peripherals associated with the second set of computing nodes;
   evaluating the first energy usage and the second energy usage; and
   dispatching the job to the first set of computing nodes at the first processing utilization based, at least in part, on said evaluating the first energy usage and the second energy usage.

2. The method of claim 1, wherein said determining the peripheral associated with each of the plurality of computing nodes comprises retrieving topology data of at least a portion of the cloud that includes the plurality of computing nodes.

3. The method of claim 1, wherein said dispatching the job to the first set of computing nodes at the first processing utilization comprises setting the first set of computing nodes to operate at the first processing utilization.

4. The method of claim 1, wherein said computing the first energy usage at the first processing utilization of the first set of computing nodes of the plurality of computing nodes and of the peripherals associated with the first set of computing nodes comprises computing an aggregate energy usage with energy usage data of the first set of computing nodes and energy usage data of the peripherals associated with the first set of nodes.

5. The method of claim 4 further comprising retrieving energy usage data for the plurality of computing nodes and the peripherals.

6. The method of claim 1, wherein said evaluating the first energy usage and the second energy usage comprises determining which of the first energy usage and the second energy usage is lowest.

7. The method of claim 1 further comprising evaluating the first set of computing nodes at the first processing utilization against a policy associated with the cloud and determining that the first set of computing nodes at the first processing utilization complies with the policy.

8. A computer program product for conserving energy usage in a cloud computing environment, the computer program product comprising:
   a non-transitory computer usable medium having computer usable program code embodied therewith, the computer usable program code comprising:
   computer usable program code configured to,
      determine resources of a cloud for serving a job, wherein the resources comprise computing nodes and associated peripherals;
      determine different configurations of the resources that comport with attributes of the job, wherein the different configurations comprise at least one of different processing utilizations and different sets of the computing nodes;
      compute energy usages for the different configurations of the resources of the cloud; and
      dispatch the job in accordance with a first of the different configurations of the resources.

9. The computer program product of claim 8, wherein the computer usable program code being configured to dispatch the job in accordance with the first of the different configurations of the resources comprises the computer usable program code being configured to set processing utilizations of a first set of computing nodes in accordance with the first of the different configurations.

10. The computer program product of claim 8, wherein the computer usable program code is further configured to evaluate the different configurations of the resources against a policy associated with the cloud, wherein the first of the different configurations complies with the policy.

11. The computer program product of claim 8, wherein the computer usable program code is further configured to determine which of the different configurations corresponds to a lowest of those of the energy usages that correspond to those of the different configurations that comply with a policy associated with the cloud.

12. The computer program product of claim 8, wherein the computer usable program code is further configured to evaluate infrastructure data of the cloud to determine peripherals associated with the computing nodes.

13. The computer program product of claim 8, wherein the computer usable program code being configured to compute energy usages for the different configurations of the resources of the cloud comprises the computer usable program code being configured to compute the energy usages of the different configurations of the resources based, at least in part, on specifications of the resources.

14. A computer program product for reducing energy usage in a cloud computing environment, the computer program product comprising:
   a non-transitory computer usable storage medium having computer usable program code embodied therewith, the computer usable program code comprising:
   computer usable program code configured to,
      determine a plurality of computing nodes for serving a job submitted to a cloud, wherein the cloud comprises the plurality of computing nodes;
      determine a peripheral associated with each of the plurality of computing nodes;
      compute a first energy usage at a first processing utilization of a first set of computing nodes of the plurality of computing nodes and of the peripherals associated with the first set of computing nodes;
      compute a second energy usage at a second processing utilization of a second set of computing nodes of the plurality of computing nodes and of the peripherals associated with the second set of computing nodes;
      evaluate the first energy usage and the second energy usage; and
      dispatch the job to the first set of computing nodes at the first processing utilization based, at least in part, on said evaluating the first energy usage and the second energy usage.

15. The computer program product of claim 14, wherein said computer usable program code configured to determine the peripheral associated with each of the plurality of computing nodes comprises the computer usable program code being configured to retrieve topology data of at least a portion of the cloud that includes the plurality of computing nodes.

16. The computer program product of claim 14 wherein said computer usable program code configured to dispatch the job to the first set of computing nodes at the first processing utilization comprises the computer usable program code being configured to set the first set of computing nodes to operate at the first processing utilization.

17. The computer program product of claim 14, wherein said computer usable program code configured to evaluate the first energy usage and the second energy usage comprises the computer usable program code being configured to determine which of the first energy usage and the second energy usage is lowest.

18. The computer program product of claim 17, wherein said computer usable program code configured to evaluate the first energy usage and the second energy usage comprises the computer usable program code being further configured to evaluate the first set of computing nodes at the first processing utilization against a policy associated with the cloud.

19. An apparatus comprising:
   a processor;
   a network interface; and
   a cloud manager operable to,
      determine resources of a cloud capable for a job, wherein the resources comprise computing nodes and associated peripherals;
      determine different configurations of the resources that comport with attributes of the job, wherein the different configurations comprise at least one of different processing utilizations and different sets of the computing nodes;
      compute energy usages for the different configurations of the resources of the cloud; and
      dispatch the job in accordance with a first of the different configurations of the resources.

20. The apparatus of claim 19 further comprising a non-transitory computer usable storage medium that embodies the cloud manager.

\* \* \* \* \*